(12) United States Patent  
Olafsson

(10) Patent No.: US 7,416,634 B2  
(45) Date of Patent: Aug. 26, 2008

(54) METHOD AND APPARATUS FOR PROCESSING NANOSCOPIC STRUCTURES

(75) Inventor: Sveinn Olafsson, Kopavogur (IS)

(73) Assignee: Matvice EHF, Kopavogur (IS)

( * ) Notice: Subject to any disclaimer, the term of this patent is extended or adjusted under 35 U.S.C. 154(b) by 396 days.

(21) Appl. No.: 10/508,532

(22) PCT Filed: Mar. 25, 2003

(86) PCT No.: PCT/IS03/00015

§ 371 (c)(1), (2), (4) Date: May 26, 2005

(87) PCT Pub. No.: WO03/080502

PCT Pub. Date: Oct. 2, 2003

(65) Prior Publication Data

US 2005/0173373 A1    Aug. 11, 2005

Related U.S. Application Data

(60) Provisional application No. 60/366,572, filed on Mar. 25, 2002.

(30) Foreign Application Priority Data

Mar. 25, 2002   (IS)   .......................... 6323

(51) Int. Cl.  
*C23F 1/00*   (2006.01)  
*H01L 21/306*   (2006.01)  
*H05C 1/00*   (2006.01)

(52) U.S. Cl. ................... 156/345.3; 427/472

(58) Field of Classification Search ............... None  
See application file for complete search history.

(56) References Cited

U.S. PATENT DOCUMENTS

| 2002/0106314 A1* | 8/2002 | Pelrine et al. ............... 422/186 |
| 2002/0122766 A1* | 9/2002 | Lieber et al. .............. 423/447.3 |
| 2003/0170898 A1* | 9/2003 | Gundersen et al. .......... 435/461 |
| 2004/0026232 A1* | 2/2004 | Boxman et al. ............. 204/164 |
| 2005/0178330 A1* | 8/2005 | Goodwin et al. ......... 118/723 E |
| 2006/0107506 A1* | 5/2006 | Doffing et al. ............. 29/25.03 |

FOREIGN PATENT DOCUMENTS

| DE | 199 35 558 A | 3/2001 |
| WO | 01 03178 A | 1/2001 |
| WO | 02 103085 A | 12/2002 |

* cited by examiner

*Primary Examiner*—Allan Olsen  
(74) *Attorney, Agent, or Firm*—Bacon & Thomas, PLLC

(57) ABSTRACT

The present invention relates to a method and apparatus for growing nanostructures in a controlled way, wherein the controlling comprises controlling the electron emitting tips used for the nanoscopic structure growth. Further, the present invention describes an integrated method and apparatus for growing a plurality of electron emitting tips and nanoscopic structures in the same growing process.

27 Claims, 15 Drawing Sheets

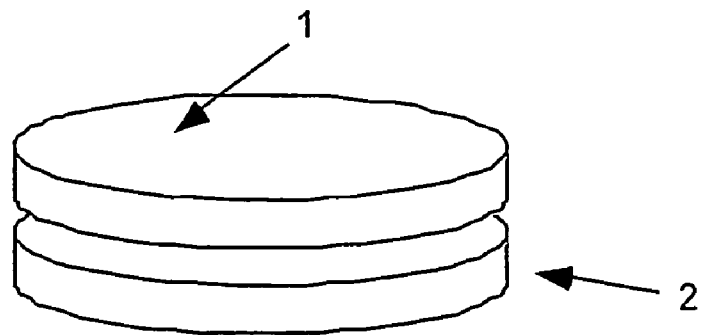
Figure 1
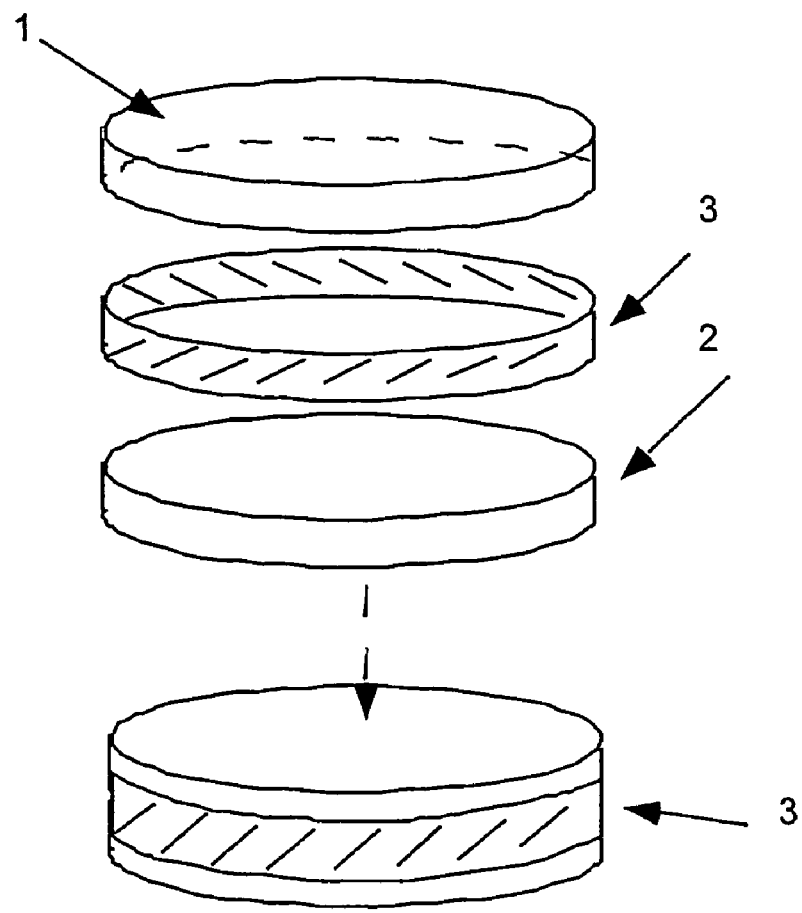
Figure 2
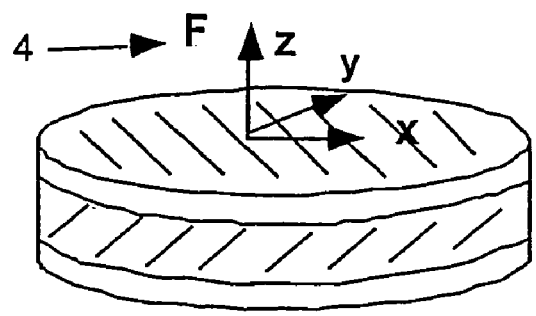

Figure 3A
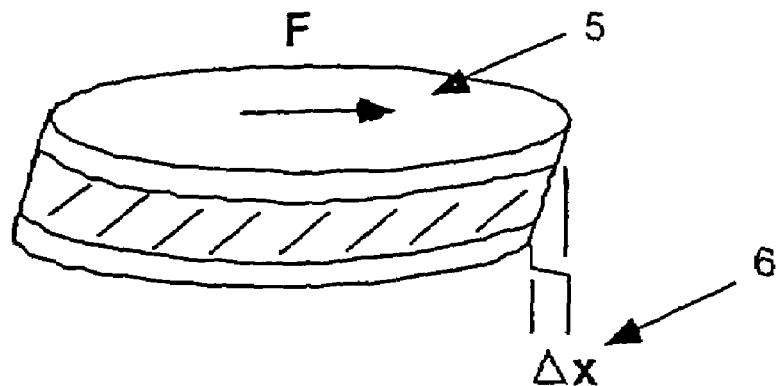
Figure 3B
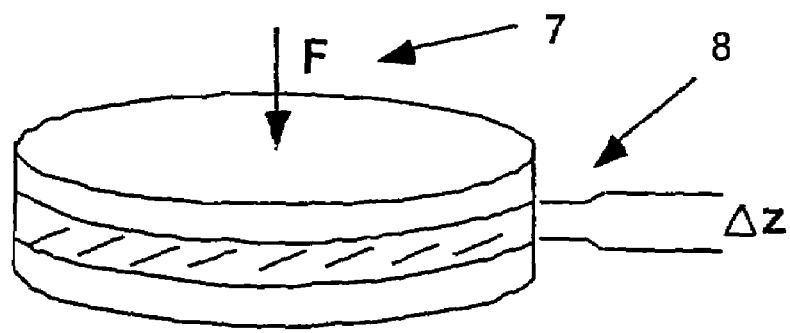
Figure 3C
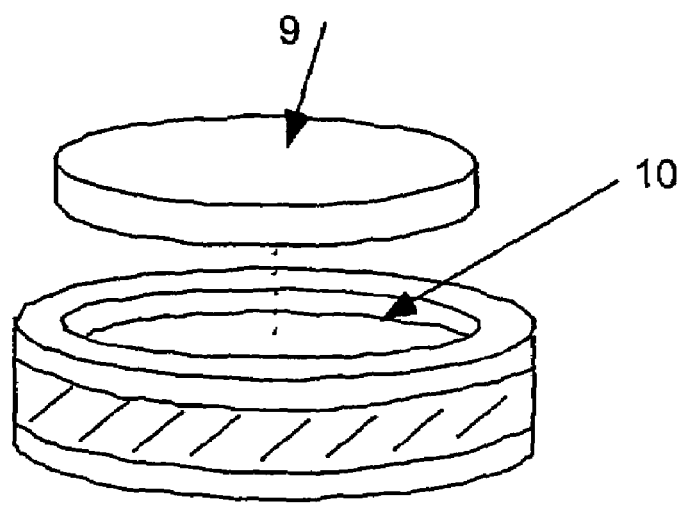
Figure 4

METHOD AND APPARATUS FOR PROCESSING NANOSCOPIC STRUCTURES

FIELD OF THE INVENTION

The present invention relates to a method and apparatus for growing one or more nanoscopic structures simultaneously in a controlled way.

BACKGROUND

Nano-technology, nano-electronics and nano-biology are areas of rapid growth in research and development, that are expected to lead to many important discoveries and developments of the coming years.

One of the main problems in nano-technology is how to grow or etch nanostructures in the size range of 0.1 nm to 50 nm in a fast and reliable manner on a large substrate or work piece. It is currently possible to do this on very small area of a few square micrometers using very time consuming procedures found in any standard clean room equipped with electron lithography equipment and other growth instruments. The standard method to define nano- and microstructures on surfaces has been optical lithography. Present ultraviolet optical techniques involve dimensions in the order of 100-300 nm. More recent methods include near-field optical lithography, X-ray lithography, and electron and ion beam lithography, where structures down to 20 nm may be formed. These methods require investment in expensive instruments, which may cost as much as 80 Million USD in total for a small research lab. The cost of mass production is however much higher, or as high as 3-5 Billions USD or even higher.

It is expected that new methods in nanotechnology will be able to reduce these costs. New methods such as molecular self-assembly are frequently mentioned in this regard. However, in a structure to be used in computing, the circuit layout is usually of a very irregular nature, a requirement making it very difficult to use self-assembly of molecular species as a production method.

Furthermore, nanostructures can serve many purposes other than computing, such as sensing by using physical interaction between a nanostructure and agents in liquids, solids or mixtures to determine varying properties.

Other alternatives for nanoscale processing are scanning probe microscope techniques (SPM) such as atomic force microscopy (AFM) and scanning tunneling microscopy (STM). Both techniques are used to characterize different surface properties depending on the nature of the tip-to-surface interaction. In scanning tunneling microscope (STM) the tunneling current between tip and surface probes the density of electronic states at certain energies. In atomic force microscopy (AFM), similar probing uses the forces between tip and sample to picture the surface. Both methods have been used to perform nanolithography or to transport atoms to build structures on surfaces. In these methods, individual atoms have been moved and placed on surfaces to create true nanoscopic patterns with atomic precision (0.1 nm).

These techniques share a common limitation in that they are not applicable for mass production of integrated circuits in nanoscale over a large area, where both logic components and electrical connections between them are in nanoscale. Numerous attempts have been made to create large arrays of SPM tips with individual control of the movement of the tip and sensing of either the tunneling current or the force. The complexity of such an approach is however tremendous.

There is therefore a need for a method and apparatus that allows scanning probe techniques to perform nanoscaled growth over large areas.

DESCRIPTION OF THE INVENTION

In one aspect, the present invention provides a method of forming at least one nanoscopic structure. The method comprises the following steps:
  a. positioning a first and a second plate in a substantially parallel arrangement, wherein at least one of the plates is provided with at least one electrode facing the other plate,
  b. providing a medium between the plates,
  c. positioning the plates in an initial position,
  c. activating the medium locally between the at least one electrode and the opposite plate by transferring energy from the at least one electrode into the medium such that growth and/or etching is induced in said medium, and thereby
    (i) growing at least one first localized structure from the at least one electrode on one or both plates; and/or
    (ii) growing and/or etching at least one second localized structure on one or both plates, thereby forming at least one nanoscopic structure.

In one embodiment, at least one of said plates comprises an array of electrodes. In another embodiment, the at least one first localized structure is prefabricated.

According to the invention, each of said localized structures can have a customized height, depth and/or shape. Furthermore, the height, depth and shape of said first localized structures can be maintained during growth and/or etching.

In one embodiment, the at least first localized structure comprises an electron-emitting tip. In one embodiment, the at least a second localized structure comprises a functional nanostructure. Such a functional nanostructure is at least one selected from the group consisting of a quantum electronic device, quantum optical device, memory device, sensor device, functional membrane, nano-wires and molecular electronic device.

In another embodiment, the height, depth and/or shape of said first and/or second localized structures is adjusted by the relative movement of said two plates. Such movement may be a nanometric scale movement.

In another embodiment, the growth of the at least first localized structure comprises growing at least two oppositely arranged first and second localized structures on said first and said second plates until a predefined distance between the two oppositely arranged structures is reached. In such an embodiment, the predefined distance may be obtained by monitoring the tunnelling current, the electric contact and/or the force contact state between said first and second localized structures.

The invention further provides a method, by which the height, depth, and/or shape of said localized structures is monitored. It is also possible by the present invention to provide a method, wherein said at least one first and/or second localized structure comprises an array of structures grown on said first and/or second plates and wherein the height, depth, length, width and/or shape of said localized structures is monitored.

The steps of monitoring the height, depth and/or shape of said localized structures comprises in one embodiment the steps of:

a. adjusting the relative position of said first and second plates so that said at least one localized structure is facing a plate area on the oppositely located plate;
b. moving one of the plates downwardly until a tunnelling current, an electric contact and/or a force contact state is reached between said at least one localized structure and the plate area; and
c. monitoring which of said at least one localized structure does not have a tunnelling current, electric contact and/or force contact state established and based thereon registering which of said at least one localized structure requires additional growth to reach the desired height, depth and/or shape.

It is further possible by the present invention to provide additional growth to said at least one registered localized structure, so as to reach desired height, depth and/or and shape of the localized structure. Furthermore, the procedure of monitoring, registering and growing can be repeated until desired height, depth and/or shape of said localized structures is reached.

In another embodiment, the procedure of monitoring, registering and growing said array of localized structures is used for repairing said array of structures. It is thus possible to maintain the structural and/or functional integrity of said structures by the method provided by the invention.

In a general sense, the present invention provides a method wherein said at least one first localized structure is used to grow nanostructures over the area defined by said at least one first localized structure and the relative movement range of the plates.

The medium used in the invention can be a growth and/or etch medium. In particular embodiments, the medium is a cryogenic gas and/or a cryogenic solid and/or a cryogenic liquid and/or an electrolyte. However, the medium can also further comprise elements of the groups III-VII in the periodic system and/or molecular hydrides of the formula MHx.

The process of activating the medium comprises transmitting an electrical pulse towards the opposite plate by means of individually controlling each of the at least one electrode. The voltage pulse can be of varying height, duration and/or form as applied to the at least one electrode.

The invention further provides input means and output means for inserting and removing the medium. Said Input and output means can be adapted to exchange media so as to remove a first medium and replacing it with a second medium. By such an embodiment, it its possible to repeat growth and/or etching procedures subsequently after replacing the growth and/or etch media.

In the context of the invention, the nanometric scale motion comprises a three-dimensional x-y-z-motion, such as a two-dimensional nanometric scale motion, such as a one-dimensional nanometric scale motion.

It should be appreciated that according to the invention, at least a part of the plates is replaceable. It is thus possible to provide embodiment, wherein said plates comprise a processing chip with electronics and wiring to form a processing surface with electrodes, and/or is provided with said at least one first and/or said at least one second nanostructure.

In a specific embodiment, coded positional information is grown and/or etched on the first and/or the second plate. The coded positional information can be read by the at least one nanoscopic structure on one and/or both of the plates.

In one embodiment of the invention, elastic support is provided on one and/or both plates for distributing an external force applied by moving means onto the plates equally over the plate area.

The present invention furthermore provides an apparatus for growing and/or etching at least one nanoscopic structure, said apparatus comprising:
a. a process cell with an interior including a first and a second plate positioned in a substantially parallel arrangement, wherein at least one of the plates is provided with at least one electrode and optionally a localized structure facing the second plate,
b. means for providing medium between the two plates,
c. an energy source for activating the medium such that growth and/or etching is induced in said medium,
d. a nanoscopic moving means for moving at least one of the plates in a nanometric scale motion,
e. communication means connected to said electrode and a process chip,
f. a computer system for controlling the growth and/or the etching process.

The apparatus can further comprise a replaceable process area or processing area and/or a process chip or processing chip. The energy source can be a controllable voltage source connected to the at least one electrode.

In one embodiment, the process cell comprises a bottom plate, a top plate, and a deformable material joining to the bottom and top plate.

The apparatus may furthermore comprise a handling instrument adapted to house the process cell, said handling instrument comprising said moving means and said computer system. The handling instrument may further comprise a controllable heating and cooling device.

In one embodiment, a part of the bottom plate and optionally the top plate is replaceable.

Furthermore, the apparatus can comprise means for providing media between the two plates comprises an input means and output means for inserting and removing said media.

In the present context, the following terms should be understood to have the meaning as stated.

The term "micron-scale dimensions" refers to dimensions that range from about 1 micrometer to a few micrometers in size.

The term "sub-micron scale dimensions" refers to dimensions that range from about 1 micrometer down to about 0.01 micrometers.

The terms "nanometer scale dimensions" and "nanoscale" refer to dimensions that range from about 0.1 nanometers to about 50 nanometers (0.05 micrometers).

The term "nanometric" refers to dimensions ranging from about 0.1 nanometer to 50 nanometers.

The term "nanostructure" or "nanoscopic material" means material that has spatial scale in at least one dimension which is roughly on nanometric scale.

The term "nanoscopic structure" means in the present context a structure on a nanometric scale, as defined herein.

The term "first localized structure" refers to a structure which is formed at or on the surface of an electrode. Such structures may be grown in situ from electrodes located either in or on the surface of a plate, or from electrodes protruding from a surface of a plate.

The corresponding term "second localized structure" refers to a structure which grows as a result of a an energy transfer from an electrode to the medium located in between the two plates, thus inducing a growth and/or an etching resulting in the formation of a second localized structure on the opposite plate.

The term "plate area" refers to any area of one or both of the plates of the present invention.

The term "microscopic tips" or "nanoscopic tips" refer to material structures protruding from surfaces and having micro- or nanoscopic spatial scale in at least one dimension.

The term "array of nanoscopic tips" means a plurality of nanoscopic tips in a closely spaced regular arrangement, where the distance between two nearest neighbours is on the order of about 1 micrometer.

The term "object electrode" means an electrode containing a dense array of micro- or nanosopic tips each individually connected to power channels allowing control of pulses created between object and image electrodes.

The term "image electrode" means an electrode on which formation of nanoscopic material takes place.

The term "contact state" means a state determined with electrical or electromagnetic means between two electrodes to represent physical contact, with methods appropriate for the given situation, including e.g. measuring voltage, current, capacitance, inductance, resistance, magnetization, force or strain.

An "electrode substrate" is in the present context considered to represent a substrate for any given electrode or array of electrodes. Such electrode substrate may for example be represented by the oppositely located plate, or a growing structure on the plate.

A "process cell" is the functional unit of the present invention. In one embodiment, illustrated by FIG. 2, the process cell is comprised of two circular plates with an elastic material at the edge of the plates creating a seal and defining a closed volume which serves to contain the medium used to grow structures on the plates.

BRIEF DESCRIPTION OF THE DRAWINGS

In the following, the present invention, and in particular preferred embodiments thereof, will be described in greater detail in connection with the accompanying drawings in which:

FIG. 1 shows a schematic view of part of a process cell illustrating a basic mechanical design with two circular base plates.

FIG. 2 shows a schematic view of a configuration in which elastic material is placed between two circular base plates and combined so as to form a process cell.

FIG. 3A shows a schematic view of an external force with components Fx, Fy and Fz applied to the surface of the cell.

FIG. 3B shows a schematic view of a displacement Δx of the top plate relative to the bottom plate when external force is applied in x-direction only.

FIG. 3C shows a schematic view of a displacement Δz of the top plate relative to the bottom plate when external force is applied in z-direction only.

FIG. 4 shows a schematic view of a process cell, where a part of the top plate has been removed.

DETAILED DESCRIPTION OF PREFERRED EMBODIMENTS

Figure 5:
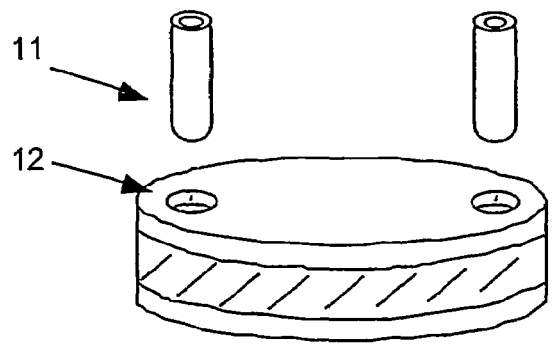
FIG. 5 shows a schematic view of a process cell, where two holes have been introduced to allow insertion and/or removal of medium into the space between the two plates.

The present invention provides a growth process cell and process handling apparatus for growing and etching nanostructures in an efficient manner on a large substrate or workpiece. The nanostructure can be used in a wide range of applications, such as sensing, computing and manufacturing of chemicals or new nanostructures. The process cell comprises the central idea for obtaining low cost and flexible operation in a typical research environment found in research organizations within universities or companies.

The invention generally relates to combining in a process cell necessary means to perform growth and/or etching on surfaces of any form at nano- and up to micro-scale dimensions inside a closed or combined process cell, which is large compared to these dimensions. The concept of a process cell provides a convenient way of inserting one particular research project into a process handling instrument, processing the nanostructure and then removing the process cell after processing. The process cell can later be reinserted into the same or a different handling instrument. In case the handling instrument is the same, the process may be continued from the point it was left. Examples of different handling instrument are a) special scanning electron microscope for viewing the surface of the nanostructure, b) thin film growth instrument for coating the nanostructure with film with elemental composition of choice, c) liquid handling instrument to study interactions of chemical species with the nanostructure in a liquid phase.

The basic instrument will control the temperature of the process cell and other necessary support functions. On the process cell there will be means to communicate with all functional units inside the process cell, possibly optically or electronically, either through electrical contacts and wiring or remotely using wireless communication. One of the main mechanical functions of the process cell is to facilitate nanometric scale motion in three directions—x,y,z—either by means inside the process cell or by external means. The former can be performed by a leverage mechanism or by motion from an internal motion transducer. The latter option could be performed by changing the shape of the process cell, for example by compressing it to perform the z motion and skewing it to obtain the x,y motion. The simplest means to accomplish a shape deformation is to join two circular plates at the external periphery. The plates can then be moved in any direction relatively to one another.

Feedback signals giving absolute position are important in controlling the x,y,z motion. In one embodiment of the invention, standard capacitance or strain gauge sensor attached to the motion transducer is used in the handling instrument. In another embodiment positional information is written on the growth surface inside the process cell.

Another mechanical function of the process cell is to contain different media like gas, liquid or a medium that is solid at low temperatures, such as temperatures in the range of 10K-200K. Necessary means to remove these media through pumping or purging are also provided through purging holes in some cases.

In one embodiment, means to clean the medium through improved pumping and filtering are also provided.

The basic structure of a simple process cell or process cell is illustrated in FIG. 1. In this figure two circular plates 1,2 are shown. The plates are defining two surfaces, which contain all means to execute the various processes inside the cell. The material of the disks can be comprised of any material of choice that is either electrically conducting or insulating.

In FIG. 2 the plates are joined with elastic material 3 at the edges of the plates. The elasticity of the material facilitates movement of the plates relatively to each other. These three items form a closed volume that serves to contain any medium, which is in the form of gas, liquid or solid, or mixtures of these, at the specific temperature the process is performed in.

The initial distance between the plates will be In the range from 1 micron to 1-3 mm. The wide range is due to the fact that in some cases the medium will initially be in a gaseous state and it will have to be compressed to the volume density of a liquid or solid when the growth cell is cooled to lower working temperatures. The working distance will however often be in the range about 1 nm-to several tens of micrometers. In some cases there will be contact between the plates in certain regions in order to create elastic soft landing or gliding pads to increase the controllability of the working distance between the plates. The maximum pressure and temperature will depend on the choice of material, but process temperature from 0 Kelvin to thousands of degrees and pressures from ultra high vacuum to few hundred thousand bars can in principle be used in a cell of the present invention.

FIG. 3A shows an external force F4 with components $F_x$, $F_y$ and $F_z$ applied to the surface of a cell. This force will deform the elastic material and change the relative distance between the two plates. In FIG. 3B the resulting displacement 6 ($\Delta x$) of the top plate relative to the bottom plate is indicated for a force 5$F_x$ applied to the top plate. Similar results in y-direction are obtained if the force $F_y$ is applied in that direction. Application of force 7$F_z$ in the z-direction is given in FIG. 3C with corresponding displacement 8 ($\Delta z$). The needed lateral total displacement range will be from 1.0 micrometer to 100 micrometer, depending on the diameter of the plates. Plates with a diameter of 1.5 cm joined with a standard stainless steel ring with thickness of about 0.25 mm will need a force of the order of 40N to move the plates laterally 1.0 micrometer or 1000 nm. Nanometer movement resolution of 1.0 nm will therefore need a force of 40 mN, which corresponds to a weight of 4 grams. This force range can easily be adjusted by changing the thickness of the elastic material. It is evident that instead of using an elastic ring to join the two plates other solutions are possible, such as forming elastic seals between the plates and allowing the seal to execute the same function. A sliding contact between the seals performs the lateral motion but compression of the seals provides the z motion. This embodiment is suitable when the handling instrument performs the necessary means to bring different plates together and form similar cell function as described above. The diameter of a produced cell can possibly cover the range from few millimeters to several meters.

FIG. 4 illustrates an embodiment of the present invention, which includes the possibility for the growth cell to include the option to remove or replace a part of the top or bottom plate 9 with help of a standard seal mechanism 10. This configuration will make the cell more flexible. For example, the cell can be put into different handling instruments that need access to the surface area of the other plate. In one embodiment, an open cell can be inspected inside a scanning electron microscope or a thin film can be deposited in a special thin film growth instrument. By replacing a part of the plate, a new processing surface is facing the opposite area or alternatively, a new processing area is facing the processing surface. This opens the possibility of making sequential operation on the cell in order to create a chain of processes with several co-working handling instruments.

FIG. 5 shows another embodiment of the invention, which comprises means to provide different growth and/or etch media in the space between the two plates. This can be realized by having at least one opening 12 with a necessary sealing mechanism. The external tubes 11, which are part of the handling instrument, are inserted into the holes, and thereby opening up a passage for either allowing gas or liquid flow through the cell or for purging the cell by pumping out of it. The sealing mechanism can be of the quick lock type found in various other sealing applications. In such an embodiment, the opening closes by a spring mechanism or the like, leaving a tightly sealed cell, as soon as the tubes are removed.

Figure 6:
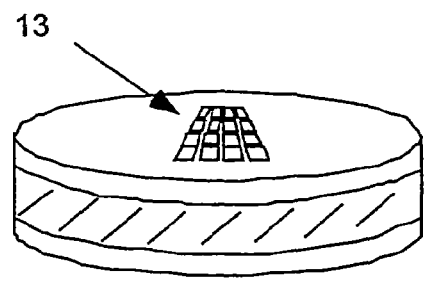
FIG. 6 shows a schematic view of a process cell, where electrical contacts have been added to the top plate of the cell.

FIG. 6 shows another embodiment for the operation of the cell. Electrical contacts 13 are placed on one or both of the plates of the cell to communicate with other instruments, controllers or other devices. These electrical contacts provide the necessary communication of signals and power to and from the innards of the cell. The electrical wiring goes to the other side of the plate in order to be used by any additional functional unit placed on that side of the plate. An alternative way of performing this, which represents another embodiment of the invention, is to use radio communications and inductive coupling of electrical power or to use light provided to a solar cell for power generation, and standard light communication, i.e., light or a laser diode. Such an embodiment requires considerable communication and software intelligence to be placed within some of the functional units.

Figure 7:
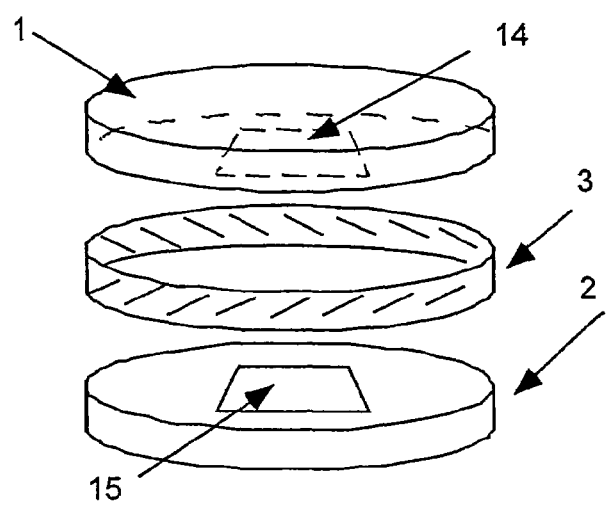
FIG. 7 shows a schematic view of a process cell, indicating the location of process regions on the plates, where nanostructured growth and etch processing is performed.

FIG. 7 illustrates a particular region on the plates where nanostructured growth and etch processing is performed 14,15. This region can be on the plates itself or on special processing plates that are either attached to the plate or mounted through the plates in a manner illustrated by FIG. 4. Sealing means permit removal and replacement of the processing plates. The processing plates can be specialized or standard silicon chips with necessary modifications to the outermost surface to provide electrical wiring to different regions of the surface. This special region of the process unit will hereafter be called the process region.

Figure 8:
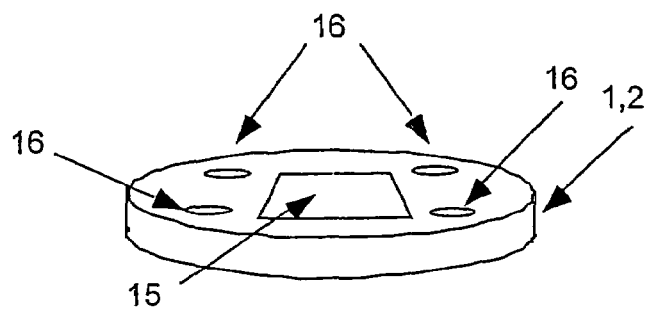
FIG. 8 shows a schematic view of one plate from a process cell, illustrating different regions serving to increase the flexibility of the process cell cell in performing nanoscale processing.

FIG. 8 illustrates a different region that serves to increase the flexibility of the cell in performing nanoscale processing. This optional region, also called service region 16, can contain many functions including the following:

An electrical activated getter for cleaning the cell free of moisture, oxygen process gas as $CH_4$, $SiH_4$ or $MH_x$ and other rest gases that can interfere with different processes, where M represents any element that forms a stable compound with hydrogen and x is an integer number. The getter, which can be comprised of Zirconium or other suitable materials, can also be used to pump the cell to ultra high vacuum conditions or down to $p<10^{-10}$ mbar.

A hydrogen serving region, which uses a metal hydride such as PdHx to deliver hydrogen to or remove hydrogen from the growth medium.

Etching regions that provide a supply of species such as $CH_4$, $SiH_4$ or $MH_x$ where etching of C, Si and M in a mixture of e.g. Argon and $H_2$ results in formation of such species.

Providing necessary illumination in the growth cell for making photoconductive material conducting, assisting chemical reactions or heating using photons of appropriate energy and intensity.

Figure 9:
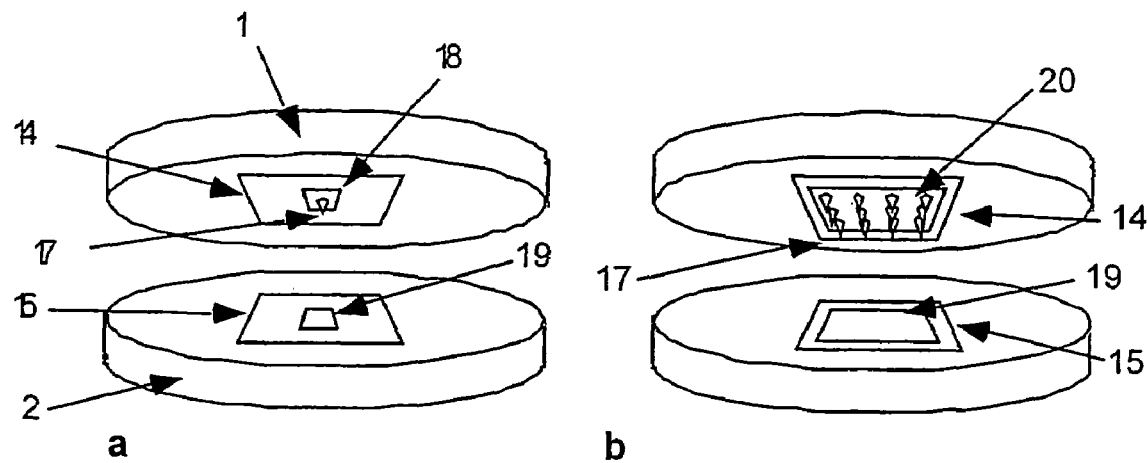
FIG. 9A shows a schematic view of the plates of a process cell, on which process regions are located. The top process region contains an electrode, on which a prefabricated tip is located.
FIG. 9B shows a schematic view of the plates of a process cell, on which process regions are located. The top process region contains an array of electrodes, on which prefabricated tips are located.

FIG. 9 shows one preferred embodiment of the invention that performs nanoscale growth in a controlled manner. The process region 14 contains in FIG. 9a one electrode 18 with one prefabricated tip 17 that is used to perform nanoscale growth on the process region 15 on the other plate in the process medium between the plates. The grown nanoscopic structure is limited in range to region 19 due to limited movement range of the cell. This process region can contain prefabricated conductive wires for making contact with the grown nanostructure. FIG. 9b shows a further extension of the embodiment of FIG. 9a, in which an array of tips with up to 100 million tips/$cm^2$ to perform the processing over large area is provided.

The growth medium in the cell can be comprised of any cryogenic material such as liquid Argon mixed with a growth species like $CH_4$, $SiH_4$ or $MH_x$ or other suitable growth materials. Although Argon is a particularly preferred cryogenic liquid for purposes of the invention, it will be appreciated that other chemically inert media may be substituted for Argon, including elements or compounds that are in a liquid, semi-solid, or even a solid state at room temperature, whether subcritical or supercritical. In addition, it is possible to use non-inert elements or compounds as the growth media so long as the elements or compounds are compatible with the chemical reactions or processes carried out within the medium. The etch medium can be Hydrogen or any standard etching compound containing elements like chlorine, fluorine etc. The use of electrolyte for electrochemical deposition or etching is also included in alternative embodiments of the invention. The prefabricated tip 17 on FIG. 9 may also be grown in situ on the electrode, in which case the tip comprises the first structure grown on the electrode. Such first structures can also in alternative embodiments take on any other suitable shape, such as a sphere, a dish, a doughnut—like shape or any other shape suitable for the particular embodiment. It should be appreciated that in the examples provided by the different embodiments illustrated in the various figures, alternative first structures are possible, either prefabricated or grown in situ.

Figure 10:
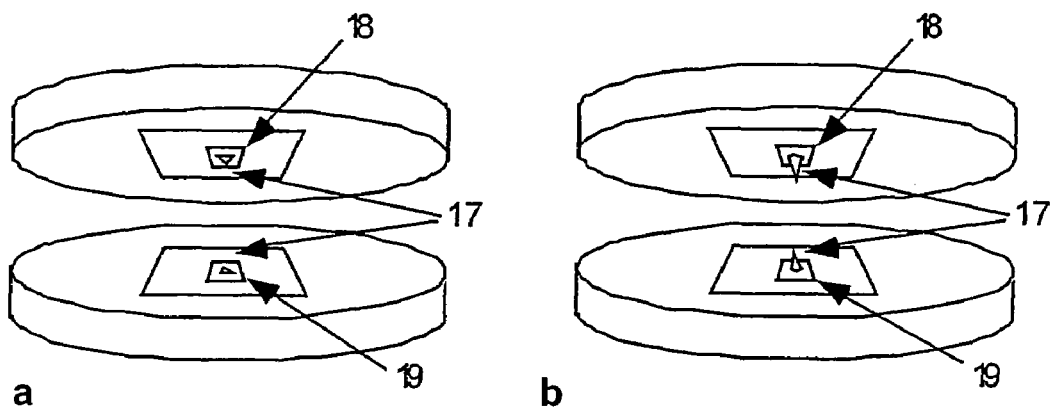
FIG. 10A shows a schematic view of the plates of a process cell, on which process regions are located. The top and bottom process regions contain electrodes with nanostructures facing each other.
FIG. 10B shows a schematic view of the plates of a process cell, on which process regions are located. The top and bottom process regions contain electrodes, with tips facing each other, where the tips have been grown from nanostructures using electric pulses between the top and bottom electrodes.

In FIG. 10 another preferred embodiment is illustrated. The prefabricated tip or tip array shoen in FIG. 9 may suffer from poor performance due to height and size variations of the tips on the nanometric scale. These variations will have drastic effects on the controllability of the processing, especially in the case of tip array processing. Even if the prefabricated tip array has extreme precision the harsh processing conditions will gradually deteriorate the height and structural integrity of the tips. As a consequence, the lifetime of the tips will control the economics and precision of such embodiments. Finding ways to grow the tips with atomic precision and maintaining that precision during processing is of utmost importance for obtaining necessary economics in large-scale growth. FIG. 10a leading to FIG. 10b shows where the production and possible maintenance of tips 17 is carried out in situ on either one or both electrodes or process regions 18 and 19. By in situ maintenance by growth processes of the present invention, tips can be grown from electrodes having tiny protrusions or a localized surface roughness, thus enabling tip formation at preferred location on the electrode surface or process region. This embodiment is furthermore expected to provide a configuration which is more economical than embodiments with static and/or prefabricated tips or other structures.

Figure 11:
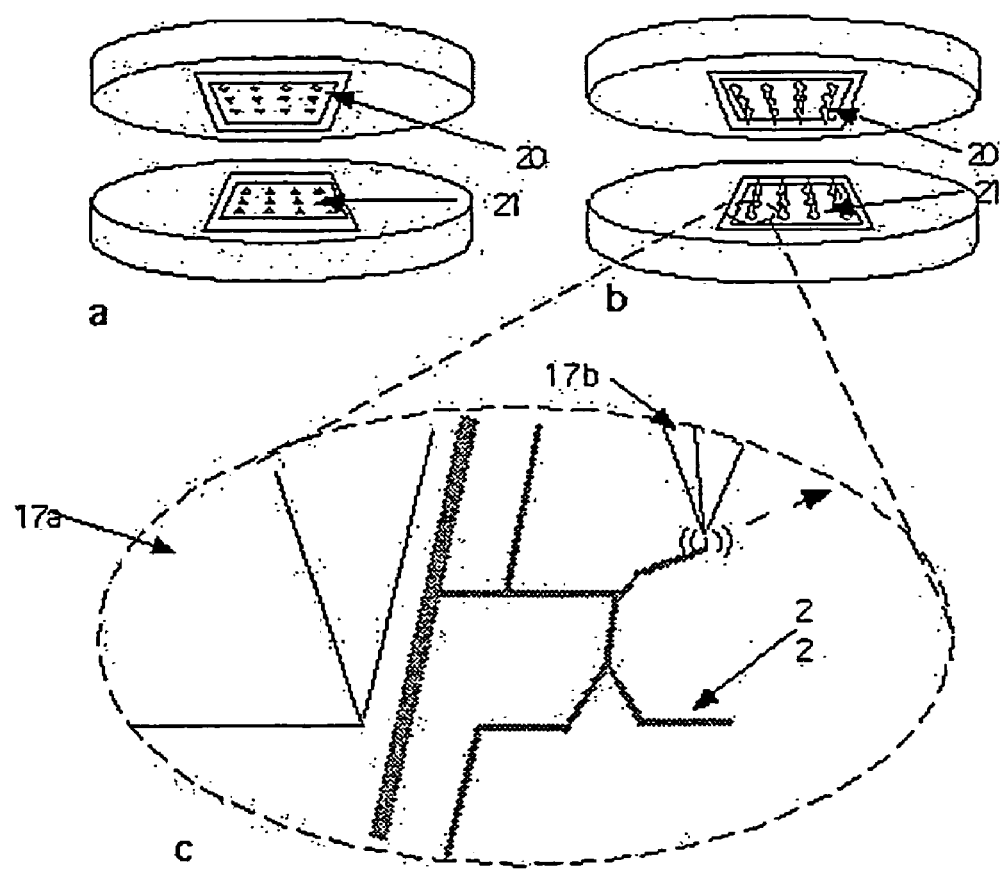
FIG. 11A shows a schematic view of the plates of a process cell, on which process regions are located. The top and bottom process regions contain electrodes with a tip array of nanostructures, with the two arrays facing each other.
FIG. 11B shows a schematic view of the plates of a process cell, on which process regions are located. The top and bottom process regions contain electrodes with a tip array that has been grown from nanostructures using electric pulses.
FIG. 11C shows a schematic view of a magnified area near one of the tips shown in figure 11B.

FIG. 11 shows a preferred embodiment of the invention in which growth and maintanance of the tip array 20 is performed in combination with the use of said arrays to allow fabrication on large-scale surfaces with atomic precision using pulses created between any one or a plurality of tips in the tip array and the opposite process region 21, on which nanostructures 22 are formed.

The shape, size, material composition and functionality of said nanostructures is only limited by the number of possible different chemical reactions and their internal structure variations possible in the given chemical environment using the pulsing process between tips and the process region. FIG. 10a leading to FIG. 10b shows how tips can be grown on both process regions 20 and 21, leading to tips being maintained in process region 20 and grown from nanostructures in process region 21. In a continuous process, a particular tip, 17b, fully formed or maintained in process region 20, is used to grow nanostructured conductors, insulators or functional devices near, or connected to, a particluar tip, 17a.

The pulses applied to the individual electrodes and the facing process region can be voltage pulses ranging between picoseconds and milliseconds in length, and arbitrary width and heights ranging between zero volts to several thousand volts, depending on material properties and growth or etch process. Each pulse can be comprised of a combination of one or multiple shorter pulses, giving a total pulse of a particular shape or pulse bunches. Chemical elements in the medium between the electrodes are activated in the pulsing process and form chemical bonds with the electrodes and/or the electrode tips or nanostructures being formed. Growth control is achieved by monitoring the absence of presence of contact between each individual tip and the electrode substrate. When all tips have been grown to desired height, they can themselves be used to further manufacture specific nanostructures on the substrate electrode using electric pulses between the fully grown electrode tips and-the underlying surface. In such embodiments, reciprocal growth can therefore be performed on both plates.

The electrode surfaces are scanned with atomic precision relative to each other in all three dimensions using piezoelectric actuators. Relative motion of the electrodes allows control over the tip shapes during their formation and growth, and furthermore allows control over the shape and form of the nanostructures grown on the image electrode with atomic precision and simultaneously over areas that are large compared with the nanostructures. By such methods, resolution on the atomic scale is possible over very large areas compared with the size of the nanostructures.

A pulse width of few ns with 100 MHz frequency could in the proposed way form 100 million chemical reactions per second, where each reaction consists of formation of several chemical bonds. Assuming homogeneous 3D material, one tip could form 1 nm thick layer of such a material on an area of 1 $\mu m^2$ in 10 ms, given that the reaction takes place with 100% probability and the tip can move 1 nm in each frequency interval, in this case 0.1 m/s, which is easily obtainable with piezoelectric actuators. An electrode surface of 1 $mm^2$ would in this example contain an array of 1,000,000 tips all connected to separate or interconnected switches allowing control over the pulse mechanism from each individual structure. According to the Semiconductor Industry Association (SIA) roadmap, 2001, dynamic random access memory (DRAM) chip sizes will be around 1,600 $mm^2$ in the year 2012, containing feature sizes of 50 nm. One such chip could be produced in the proposed way in 16 seconds with the rate of 240 chips/hour. For a feature size or pixel made from homogeneous material of 50 nm in all three dimensions, spaced 100 nm apart, the proposed production method allows throughput for a single 1 $cm^2$ electrode surface of 800 Mpixels/s (if the production tips are placed on a 1 $cm^2$ array with 1 $\mu m$ spacing as before, the rate would be 100 times faster). A more realistic estimate would assume different material composition for each pixel, which means that the process will take more time but the electrode surface areas can cost-efficiently be increased by several orders of magnitude, and the nanoscopic structures can be made smaller and more closely packed.

For the described atomic precision growth, it is assumed that the object and image electrode plates can be placed in nanometrically close contact uniformly over an area that is large compared with the distance between the surfaces, more specifically an area of at least 1 $mm^2$ and preferably 1 $cm^2$ or more. The use of electrodes with atomic scale smoothness extending over an area of several millimeters represents an essential prerequisite for directing molecules into targeted nanoscopic architectures. Single crystal metal surfaces can traditionally be manufactured with a precision of 0.5 degrees, but replica techniques allow production of large-scale smooth metal surfaces, with root mean square roughness of 0.4 nm and same large-scale smoothness as the replicated substrate (see J. Diebel et. al. "Fabrication of large-scale ultra-smooth metal surfaces by a replica technique", Appl. Phys. A vol. 73, pp.273-279, 2001). High quality commercial silicon wafers have surface uniformity of a few nanometers over wafer length scales of at least 300 mm. Layered crystals such as mica, HOPG or $MoS_2$, have atomically flat terraces but can have microscale height differences over areas of a few centimeters. Atomic scale growth inaccuracy on surfaces with micrometer scale height differences can, in preferred embodiments of the Invention described herein, be minimized by plasma etching.

Figure 12:
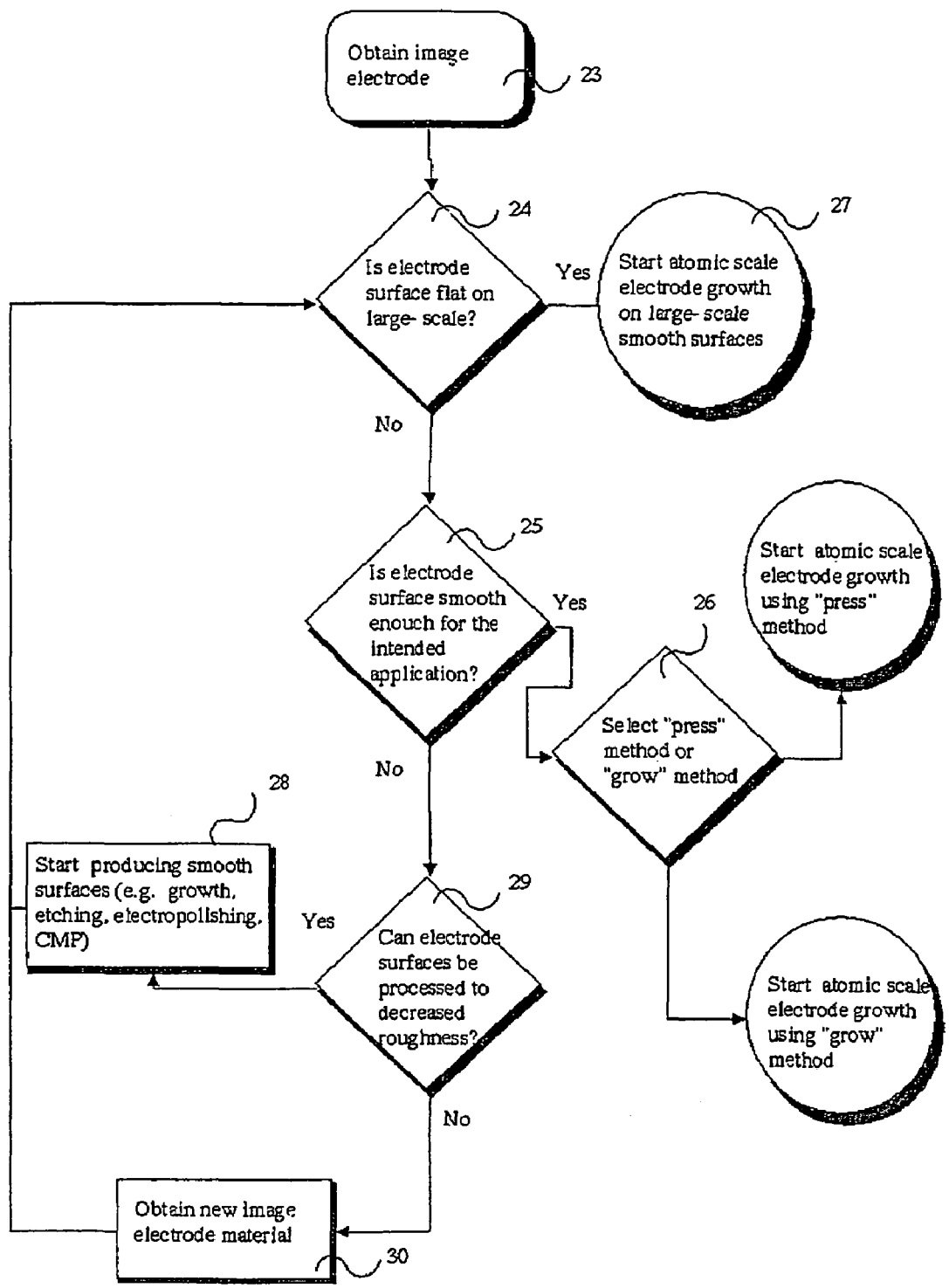
FIG. 12, 13, 14 and 15 contain flowcharts describing production methods useful in preferred embodiments of the invention.

It is important to find methods allowing growth and etching in the described environment on electrode surfaces that may or may not be smooth on large scale. The flowchart in FIG. 12 is used to determine how to achieve nanometric distances between two obtained plate electrodes, 23, over areas that are large compared with the distance between the plates. By registering the contact state between electrodes on object and image electrode plates, information on the distance between the plates at all electrode locations in the array can be obtained.

Figure 13:
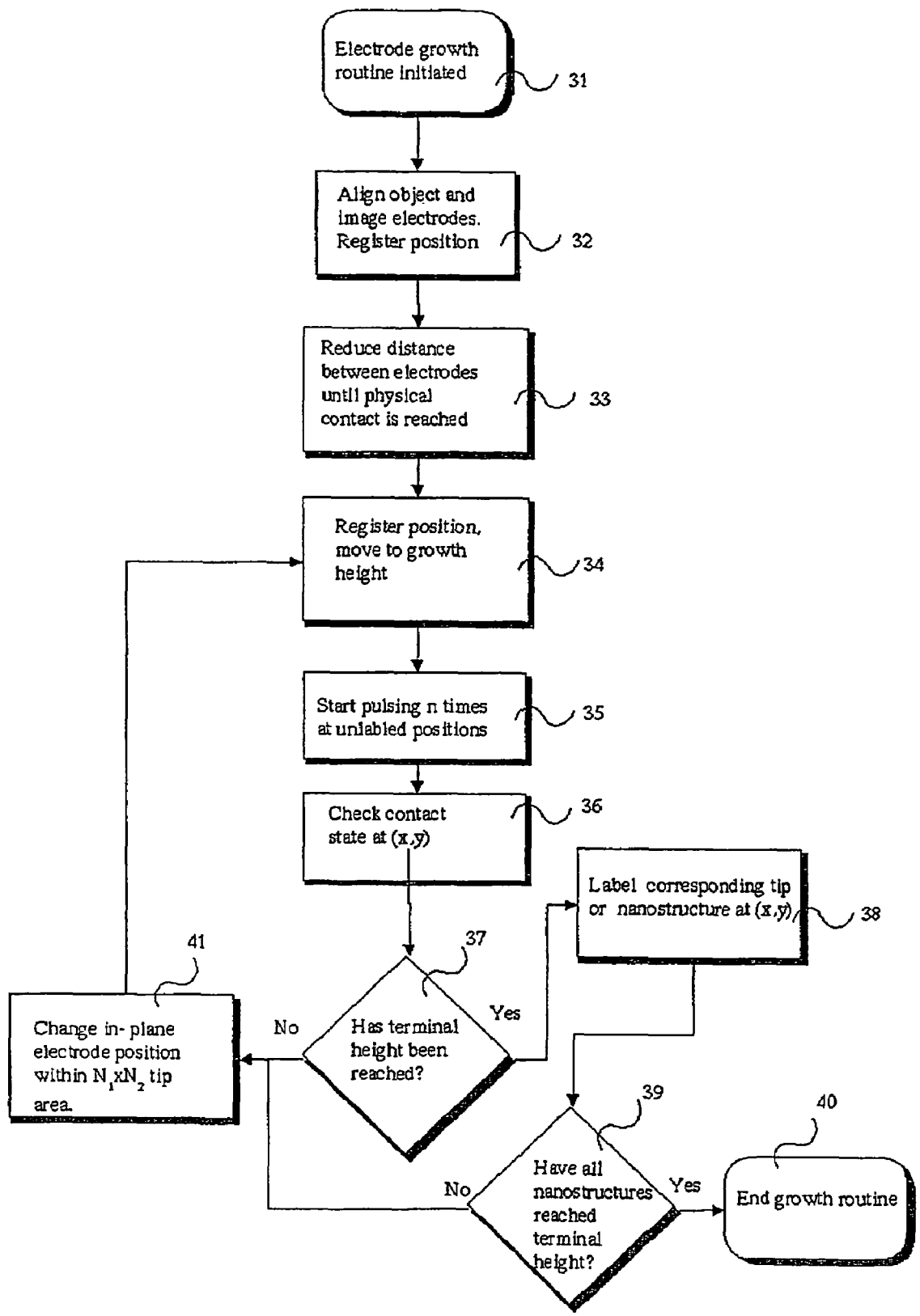

If the electrode surfaces are flat on large scale in the growth/etch environment, 24, atomic scale electrode growth 27 can begin without further processing or considerations, using the methodology described in the flowchart of FIG. 13.

Figure 14:
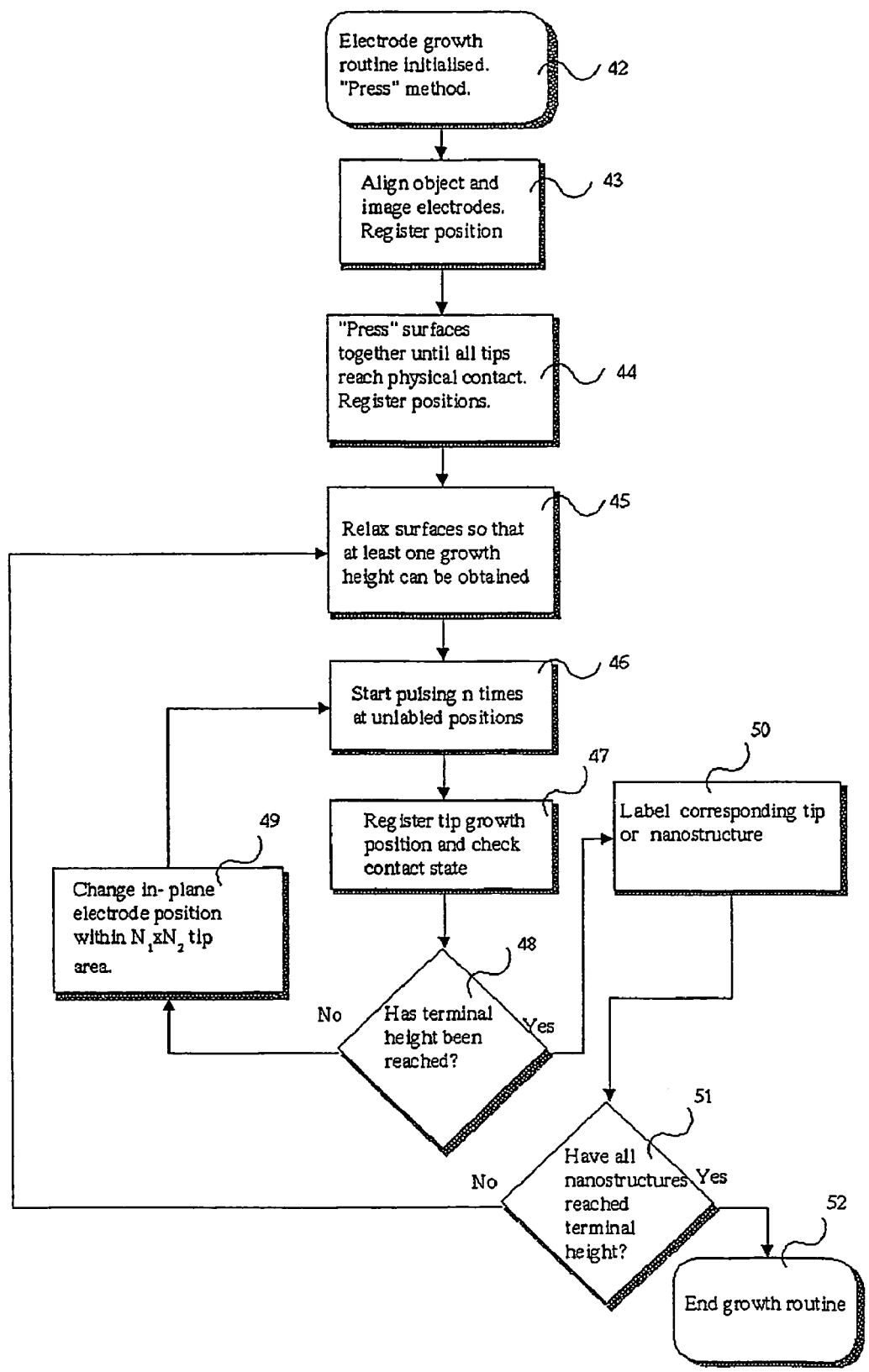
Figure 15:
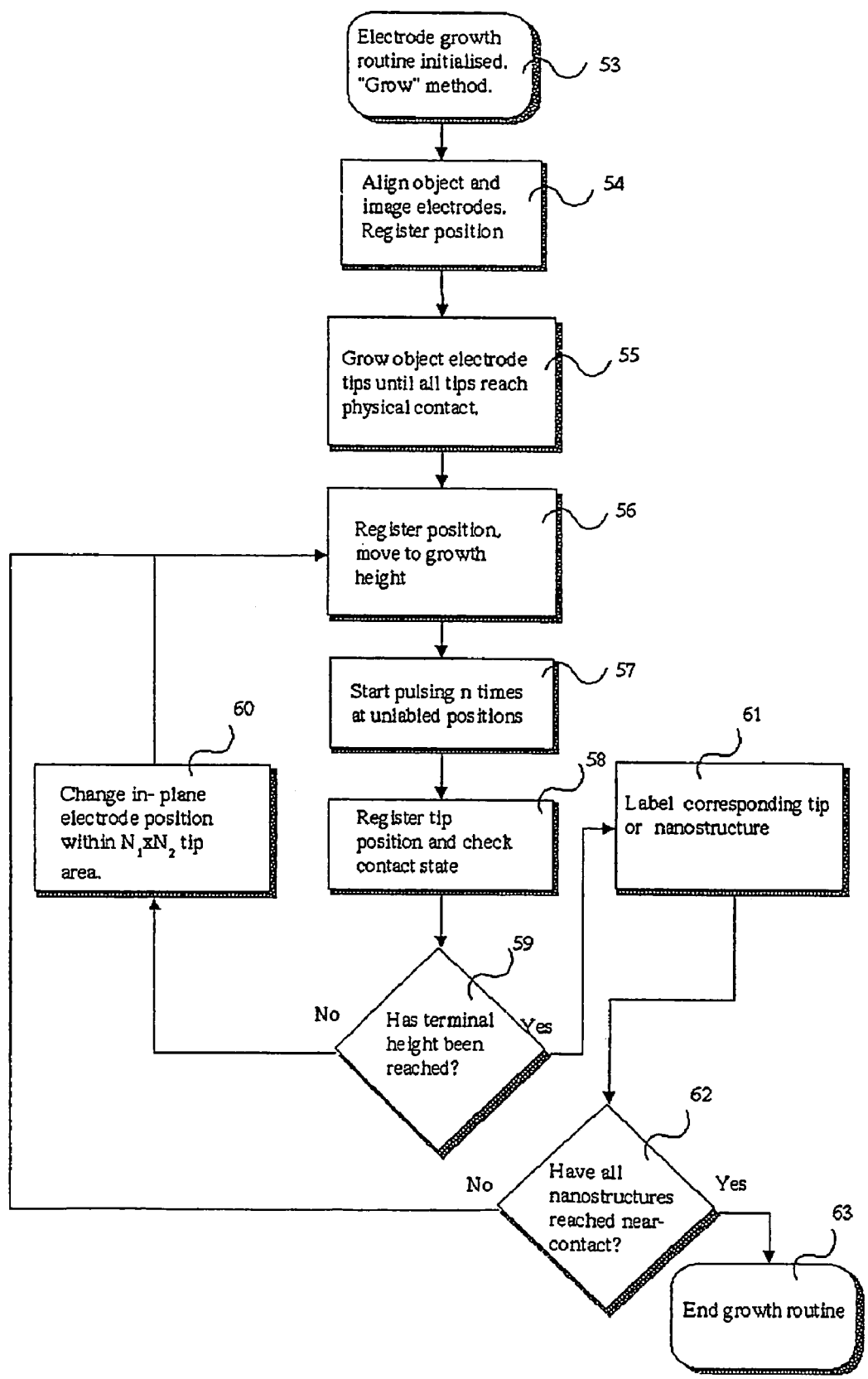

If the electrodes are smooth enough for the intended application, 25, although possibly smooth only on micrometer square areas, atomic scale electrode growth can begin using flowchart on FIG. 14 or flowchart on FIG. 15, depending on the outcome of decision 26, allowing nanostructure growth on stepped surfaces, which can be smooth on large-scale compared with the scale of nanostructures.

If the electrode surfaces are flat on a nano-scale only it cannot be characterized with nanostructured architectures on a large scale and the surfaces need to be processed to increased smoothness, 28. This can be accomplished by growing in situ a layer of material identical to the substrate, using previously described electrical pulses between the electrodes. Etching, electropolishing and chemical mechanical polishing (CMP) could also be achieved inside the process cell.

If the electrodes are rough on nanoscale, a decision will have to be made, 29, whether it is possible to increase the smoothness of the surfaces using e.g. growth, electropolishing or controlled etching, 28. If no method can be used to smooth the electrode surface, it will have to be replaced with an electrode with smoother surface, 30.

The flowchart in FIG. 13 describes a method to grow tips on electrodes on large-scale smooth surfaces or two surfaces that are smooth on the microscale and can be placed with nanometric distances between the electrode on large-scale. First, 31, all parameters needed for the growth procedure are set. The settings depend on the material being used in the growth medium, type of electrodes, the type of nanostructures or tips to be formed, tip height, density of nanostructures, frequency of the pulse and pulse height, etc. The image electrode may or may not in the initial step have nanostructures. The electrode plates are aligned, 32, in parallel so that the distance between the surfaces is small on nanometric scale uniformly over large-scale surface. The electrodes are displaced in direction normal to their surfaces so that all electrodes in object array reach physical contact, 33, where the relative position of all electrodes, in all three dimensions, is registered, and the electrodes are moved to growth height, 34, which is the height corresponding to gap distances between electrodes appropriate for the desired growth rate in the given geometry, material composition in both electrodes, growth medium and other contributing factors. Electrical pulses are initiated, 35, between the electrodes at object electrode positions that have not been labeled specifically to be in "off" state, which happens when the tip or nanostructure has reached the user specified terminal height. The number of pulses issued affects the rate of growth, and will have to be specified at process initialization. On the nanometric scale and in the proposed environment, certain randomness in the growth rate is expected and the contact state at the current x,y position in the image electrode plane will have to be monitored, 36, after a certain number of pulses, n.

If the contact state satisfies conditions equal to or within a determined range defined to be physical contact between a specified tip or nanostructure and the opposite electrode, and the tip or nanostructure have reached terminal height, 37, as defined by user, growth is halted at the corresponding nanostructure and its position labeled at the current x,y coordinate, 38, and the whole process is terminated, 40, if all tips or nanostructures have reached terminal height, 39, at that coordinate, determined with the same method.

Figure 16:
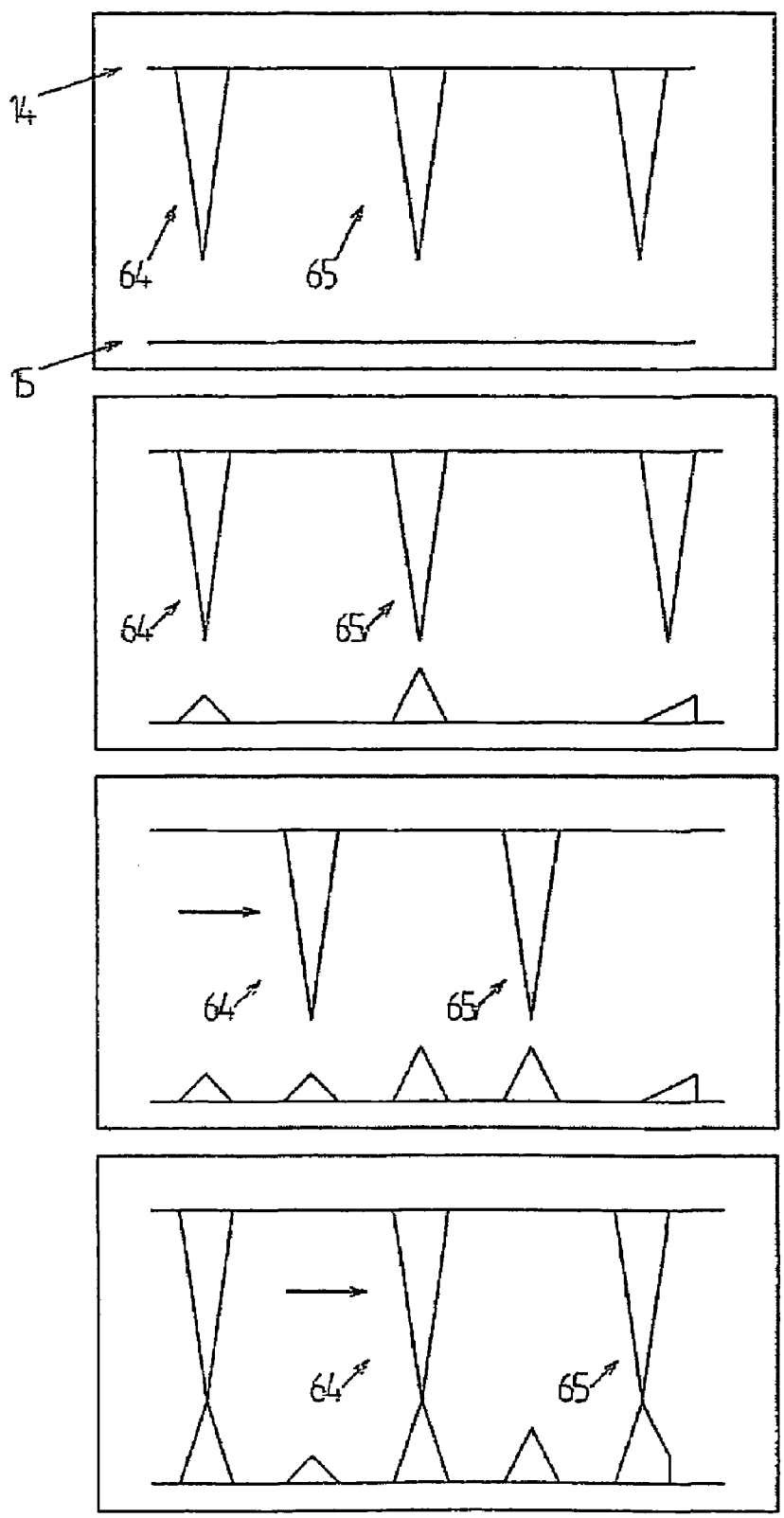
FIG. 16 shows a schematic view of an array of object electrodes and image nanostructures, showing how one or more objects can participate in the growth of one or more nanostructures.

If physical contact, as defined above, is not reached at the terminal height position, the pulsing process is repeated at a new growth height, 41, depending on what kind of nanostructure is being grown. Conical shaped tips can be produced by nanometric in-plane relative electrode plate circular motion. Nanostructures on micrometer sized areas can be produced even over areas of several $\mu m^2$ in size, with a tip area equal to $N_1 \times N_2$, where $N_1$ and $N_2$ are certain numbers of object electrode tips, allowing different tips to grow the same nanostructure to ensure homogeneous nanostructure growth. FIG. 16 shows nanostructures being formed, where tip, 64 and 65 are allowed to participate in the formation of a single nanostructure.

In one preferred embodiment of the invention, the object tips are grown from perfectly flat object electrodes, where the starting location of tip growth on any particular electrode is determined by the position of a nanostructure on a facing electrode. When the electrodes have been aligned according to FIG. 13, and put into position, 33, the initial pulses will create nanostructures on the object electrode and gradually form tips when the relative motion of the electrodes is adjusted during growth as to allow such formation. The height of tips can be controlled by allowing mechanical or physical contact at the nanostructures and compared with a substrate mechanical or physical contact at an area where nanostructure growth is not allowed so that all or any number of tips can at any time during the growth process access that area, termed the calibration area. In this case it has to be assumed that the height of the image nanostructures is small compared with tip height, but this will only be true when tip growth is well underway.

The flowchart on FIG. 14 describes another embodiment of the invention, in which nanostructures on micro-scale smooth surfaces are produced, where the substrate electrodes are made from soft material that can be pressed together without destroying the nanostructures. This material preferably has properties of a ductile material, i.e., maintaining the deformation after pressure has been released or of elastomers, relaxing to the original form when pressure has been released. The image electrode may or may not in the initial step of this embodiment have nanostructures. The growth routine is initialized, 42, and the object and image electrodes are aligned and their relative position registered at each electrode location in the object electrode array, 43. The surfaces are pressed together until all tips reach physical contact, 44, and the position at each object electrode is again registered. The surfaces are relaxed to growth height, 45, which is determined from the initial parameters, and electrodes measured to be in physical contact are labeled to "off" state (if the object electrode material shows pure ductile properties, no such labeling is expected in this step, see FIG. 17). Pulses are initiated at unlabeled object electrode tip positions, 46, and the contact state measured after n such pulses, where the number n is determined from initial parameters. The contact state is determined at each object electrode position, 47.

If terminal height of a nanostructure or tip has been reached, 48, the position on the image or object electrode is labeled to "off" state and growth is terminated, 50. Otherwise, the electrode plates are moved in a parallel fashion relative to each other within an area that can be so large as to cover parallel motion not compromising the shapes of the electrode surfaces, including tips and nanostructures, 49. Said area can cover the dimensions of several object electrode spacings, but the parallel translation of each tip is limited by obstacles that are higher than the nanostructures being formed by a particular tip. Such limitations are not as severe for electrode material having elastomeric properties as they are for ductile material.

Figure 17:
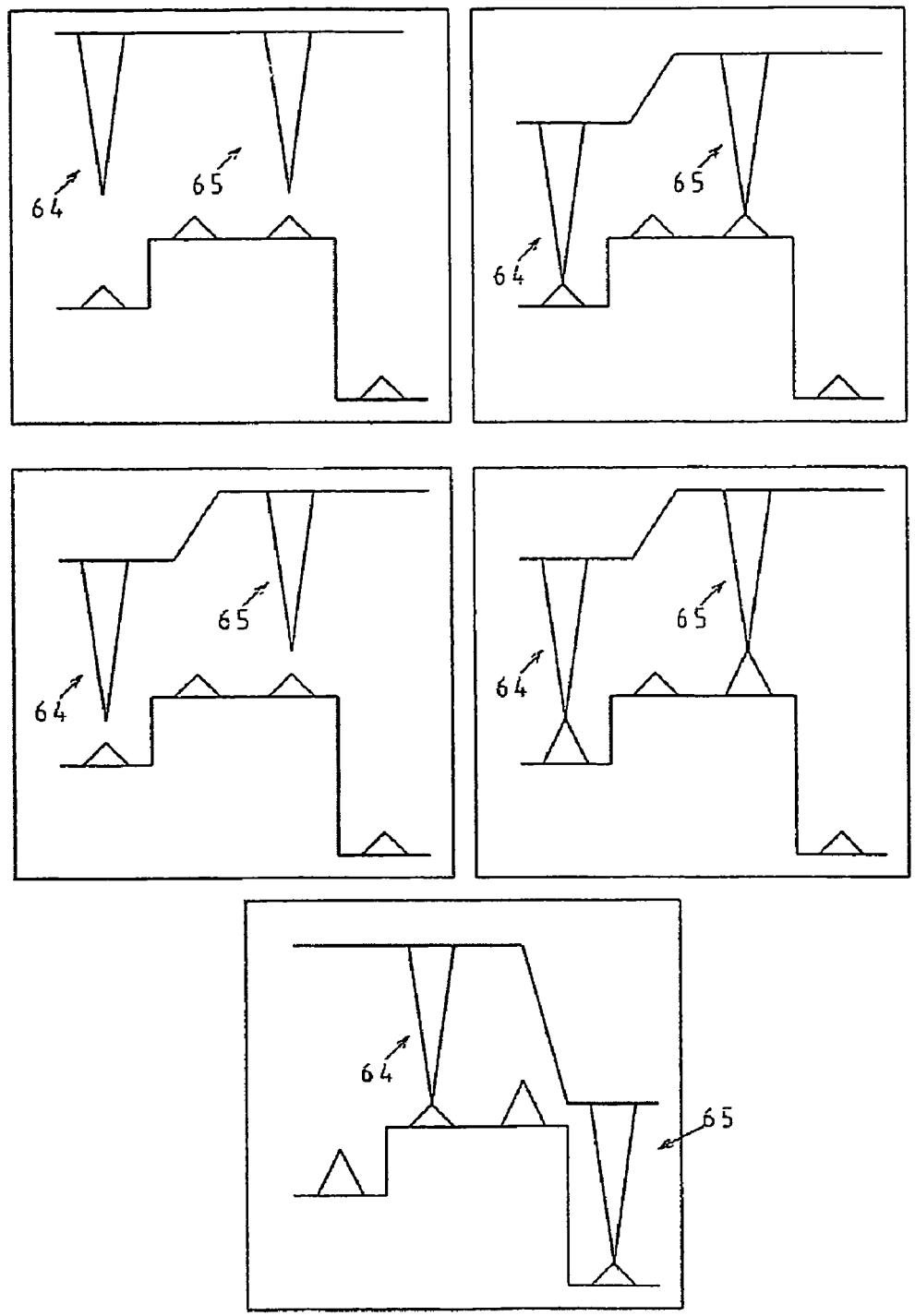
FIG. 17 shows a schematic view of an array of object electrodes and image nanostructures located on a substrate or substrates that are not smooth on a scale that is large compared with the nanostructures. The surfaces are pressed together and if one or both substrates are made from material having ductile or elastomeric properties, the surfaces can be made to reach mechanical contact in an area that is at least larger than the mechanical contact area without pressure, and the shape of the object and image electrode surfaces are shaped to match to a large extent. Only the pure ductile properties of the object electrode substrate is shown here for simplicity, and the image surface is in this case rigid.

If all nanostructures or tips have reached terminal height, 51, the growth process is terminated, 52. If terminal height for all structures has not been reached, the surfaces are further relaxed so that at least one and preferably a number of labeled tips can reach growth height, and the process is repeated until terminal height is reached for all structures. If the area available to each object electrode tip is believed to be too small to be able to grow homogeneous tip structures, or restricting growth of nanostructures on all the process region, the electrodes can be moved far apart and repressed at a different location, as illustrated in FIG. 17, where tip 64 has been pressed at an image electrode surface location where tip 65 was located previously.

Figure 18:
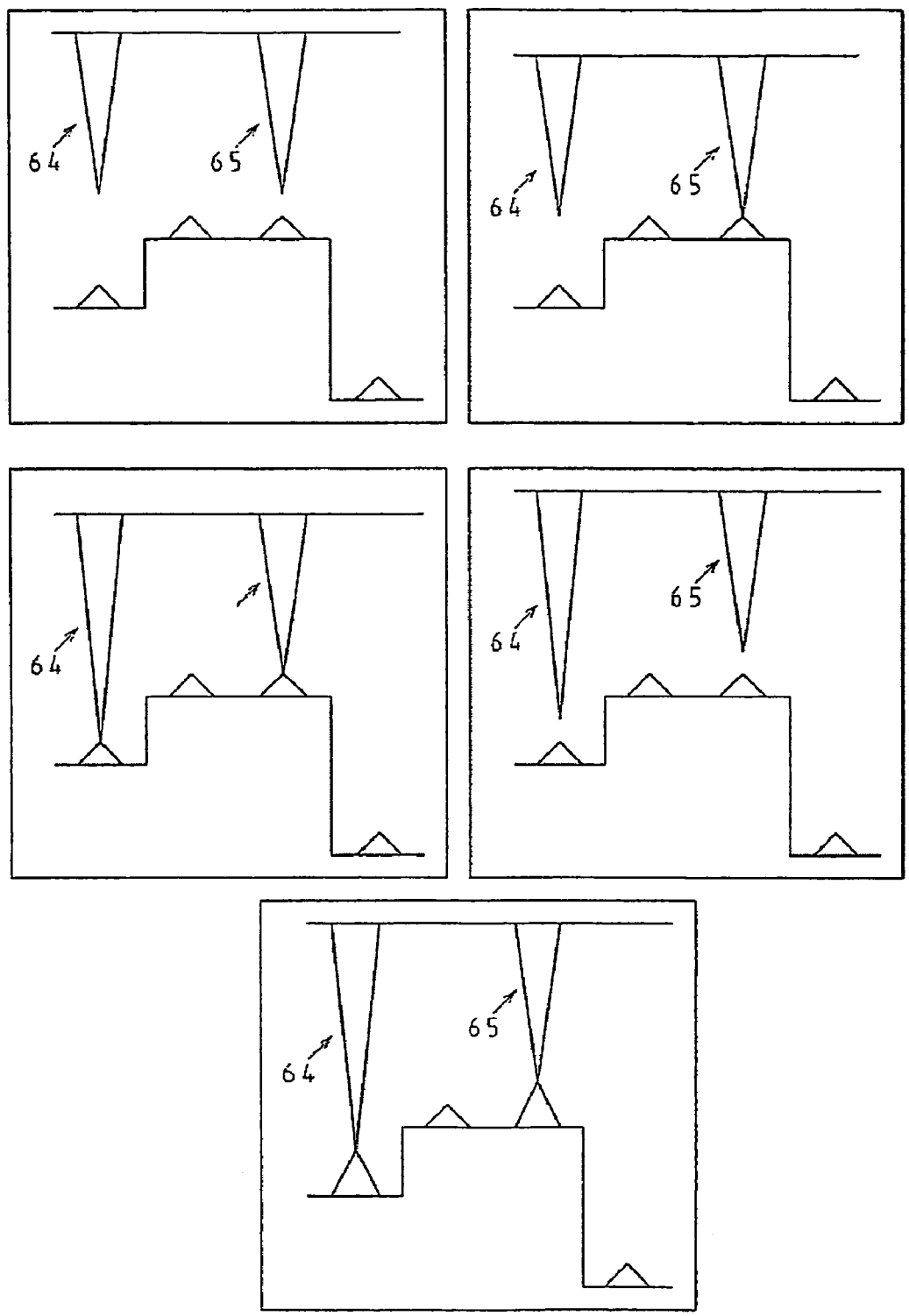
FIG. 18 shows a schematic view of an array of object electrodes and image nanostructures located on a substrate or substrates that are not smooth on scale that is large compared with the nanostructures. The nanostructure growth-promoting tips on the object electrode surface are grown to reach physical contact with the facing image electrode surface, with or without nanostructures, so that the growth promoting tips form a surface mesh matching the facing image electrode surface, thus allowing nanostructure growth on a large scale with atomic precision.

The flow chart in FIG. 15 describes a method to grow nanostructures on micro-scale smooth surfaces by growing the object tips so that all tips can reach physical contact simultaneously, as illustrated in FIG. 18, where tips 64 and 65 have been grown to different lengths allowing both tips to be simultaneously in physical or mechanical contact with the facing electrode, nanostructure or tip. The object electrode may or may not in the initial step have an array of growth promoting tips, and the image electrode may or may not have nanostructures. The electrode plates are after initialization, 53, and alignment, 54, moved in physical contact at tip locations where such contact is possible, 55, but grown to physical contact at locations where physical contact was not achieved in the alignment step. By relative motion, the electrodes are moved to growth height, 56, determined by initial parameters as described in previous methods. A number n of electrical pulses is initiated, 57, and the contact state is registered, 58. If terminal height has been reached, 59, the corresponding nanostructure location or tip is labeled, 61, and if all nanostructures have been labeled, 62, the growth routine is terminated, 63. If terminal height has not been reached, the relative tip-surface location of all tips is changed within an area determined by user but not larger than an area that is smooth on a scale that is large compared with the nanostructures, and on which no hindered in-plane motion of any tip takes place.

If the area available to each object electrode tip is believed to be too small to allow growth of homogeneous tip structures, or structures covering the whole process region, the electrodes can be moved far apart, the object electrode tips etched and regrown at a different relative surface location.

Any or all of the methods used to obtain nanometric distances between the electrode surfaces can be used in combination. When all nanostructures have been eliminated from the growth procedures in said way, the process is complete and all nanostructures are of the same height, or more specifically, within a statistical average height determined by growth errors mostly from eventual material growth on object tips or errors in the determination of the relation between tip-nanostructure distance and the contact state, leading to inaccuracies in the determination of physical or mechanical contact.

In one preferred embodiment of the invention a method to ensure production homogeneity of grown structures is used. In this method all nanostructures are produced, using at least a certain number of different object electrode tips. This will compensate for eventual growth or etching rate differences occurring in the gap between any two tips or a number of tips and a particular nanostructure (due to shape, length, detailed composition, etc.) and will increase the lifetime or time interval between maintenance of a given object electrode tip array.

Figure 19:
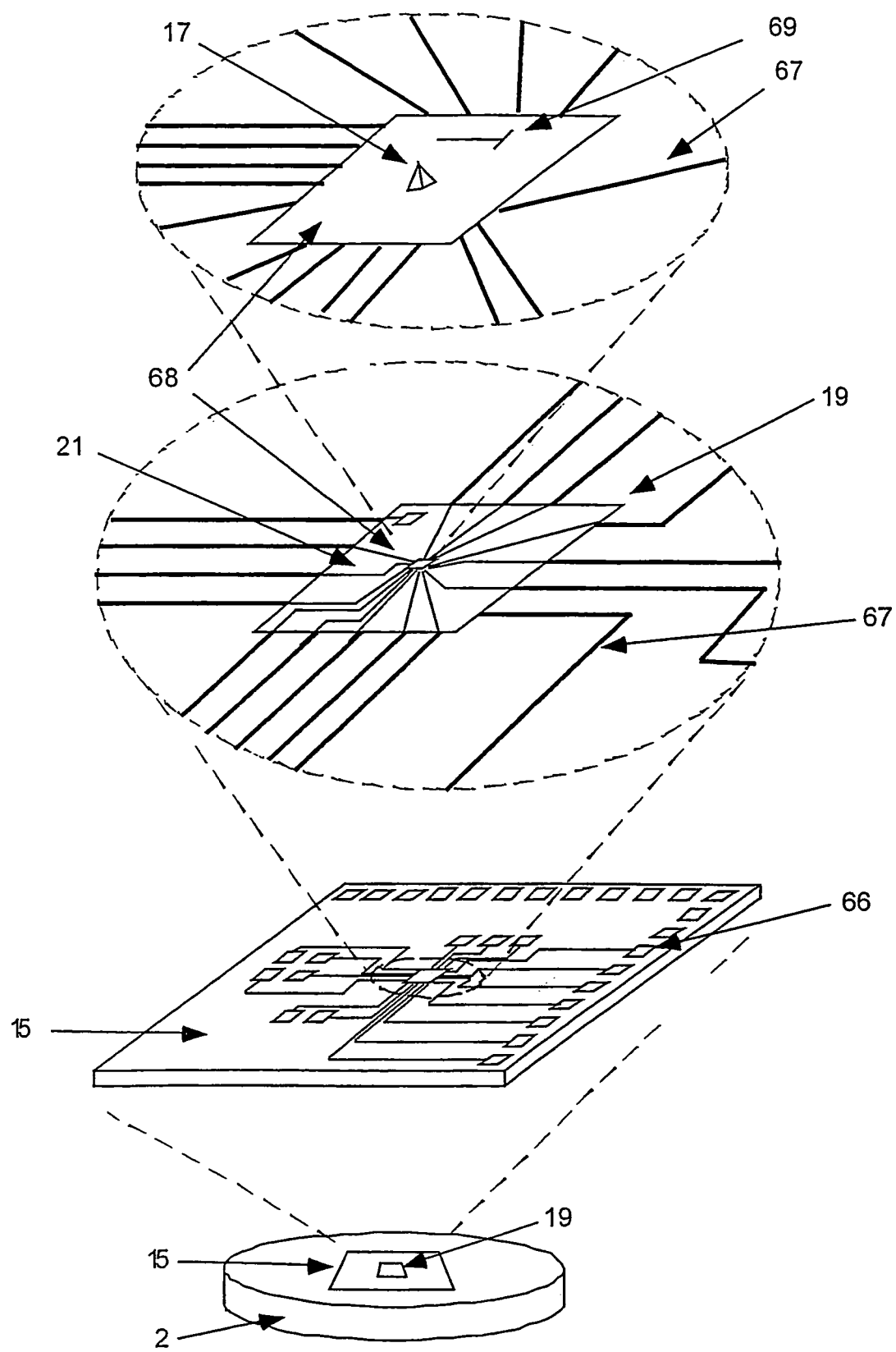
FIG. 19 shows a schematic view of a process cell plate on which a process region is located. The process region has connection points allowing external electrical wiring to control devices, and from each contact point, conducting wires lead to a central region where a tip is located and has been connected to several connection points.

FIG. 19 illustrates one embodiment of the invention, in which a magnified view of the processed zone of one of the plates 2 is shown, in which case there is a single processing tip in the zone. A special chip 19 is placed in the processing zone. The growth zone of the tip 68 is typically limited to an area with side length of 1 to 10 micrometers. This chip provides necessary electrical wiring 67 to this growth zone as seen in the figure. Contacting pads 66 on the upper side and lower side (not shown) are needed to interface this chip with the outside world, either with digital signals or analog signals. The tip in the processed zone 17 is seen as well as a nanostructure 69 that has been grown on the surface by the upper tip on the upper plate in the growth cell. The special growth chip can be any Si electronic chip produced in high quantities, by well know semiconductor companies such as Intel Motorola, National Semiconductor, Toshiba, Hitachi etc. Putting the P4 chip inside this cell is possible, as well as a standard 8 bit microprocessor controller.

It depends on the application which chip is needed. There are two main alternative ways to prepare the surface of such a semiconductor chip for processing in the processing cell. One is to add additional isolation and metallization layers on top of the chip using the same methods that are used in semiconductor fabrication, i.e., by a lithography step with thin film deposition of an isolation metallization layer. To get an atomically smooth layer, CMP (chemical mechanical polishing) polishing of the top layer is needed to create the condition for processing, especially for processing by a large array of tips. Another way to accomplish this is to prepare this on a special plate that is attached on the surface of the Si chip.

Figure 20:
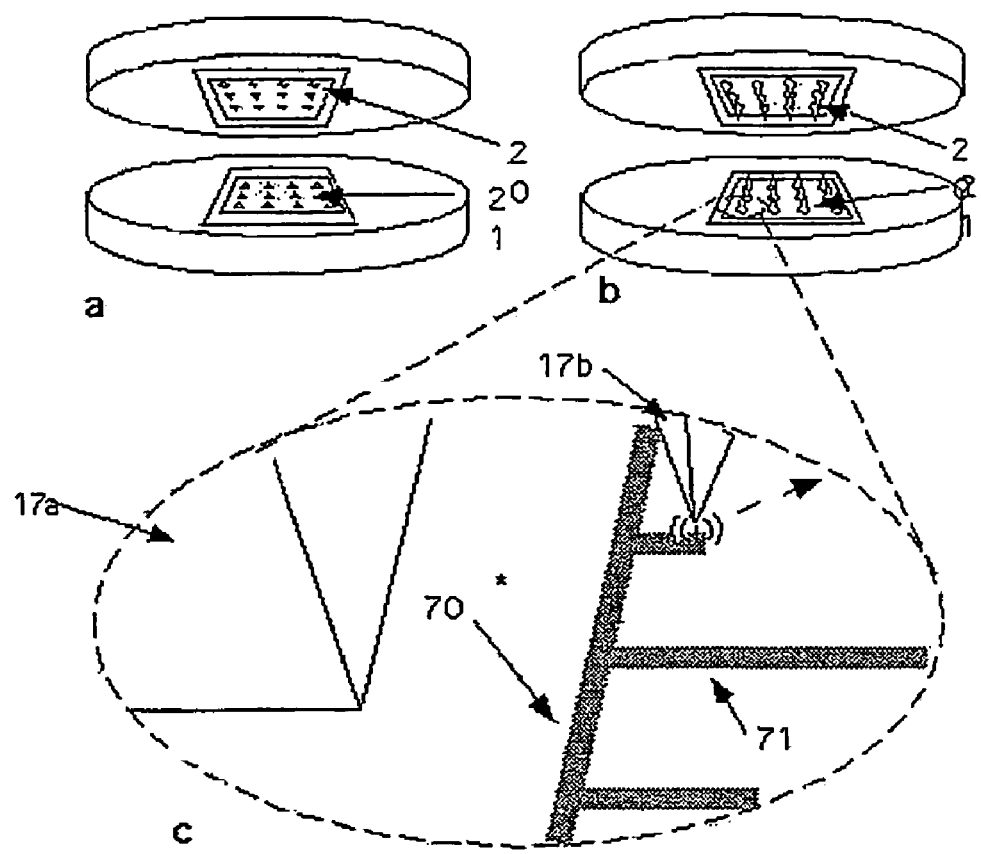
FIG. 20A shows a schematic view of a process cell comprising plates on which process regions with electrodes containing nanostructures are located.
FIG. 20B shows a schematic view of a process cell comprising plates on which process regions with electrodes containing grown tips are located.
FIG. 20C shows a schematic view of a magnified area near one of the tips on the bottom electrode. The position of the bottom plate relative to the top plate is determined by using special reading tips that can detect the location of patterned nanostructures on either electrode.

FIG. 20 illustrates yet another embodiment, in which a feature for obtaining at least atomic precision in determining the x,y position of the upper plate with reference to the lower plate is shown. This feature is obtained by writing/growing special positioning pads 71 with regular intervals on to a common signal line 70 which is connected finally to the x,y,z motion controller. A reading tip reads the position information from the pads on the signal line. The number of signal lines and the distance betweens the pads can be arbitrary. It is only required that the length of the padded signal line is longer or equal to the movement range of the process cell. All known positioning codes can be implemented in this way, such as standard binary code or the less error-prone Grey code. In case there are many tips forming a large array some tips can be specifically designed to perform this function. A 16 bit binary code requires at least 16 signal lines with the pad size and distances according to the binary weight of that line. Simpler coding is possible by using two or more signal lines grown with random pattern with distances and pad sizes that have a period at least half the movement range. The control system can learn the pattern by scanning it and comparing it to the signal feed to the x,y, movement actuator.

Figure 21:
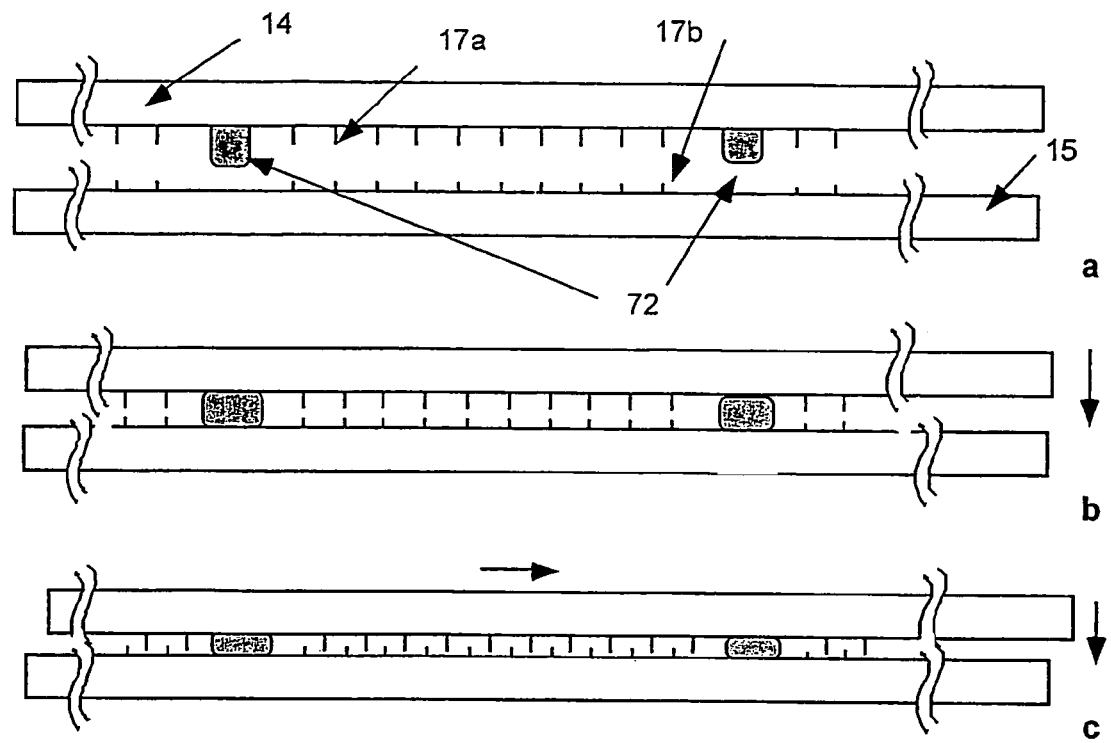
FIG. 21A shows a schematic view of two process regions containing tip electrodes and oppositely facing nanostructures. The top process region contains elastic pads that are taller than any tip in the top process region.
FIG. 21B shows a schematic view of two process regions pressed together so that the elastic pads deform and allow close spatial vicinity of tips and nanostructures.
FIG. 21C shows a schematic view of two process regions pressed together so that elastic pads deform and slide laterally to allow close spatial vicinity of tips and the bottom process region.

FIG. 21 shows another function for such pads that are placed or grown by the tips on both or one of two plates. The height and size of such pads is much larger than the height of the tips. The growth conditions during growth give the structure certain sponginess and elasticity. This is then used to bring the two plates in mechanical contact in some padding regions in order to gain more control in moving the two plates relative to each other and also to control the working distance between the plates more easily. If the elastic pads are distributed evenly over the whole area between the plates the applied external forces are supported over the whole are.

Figure 22:
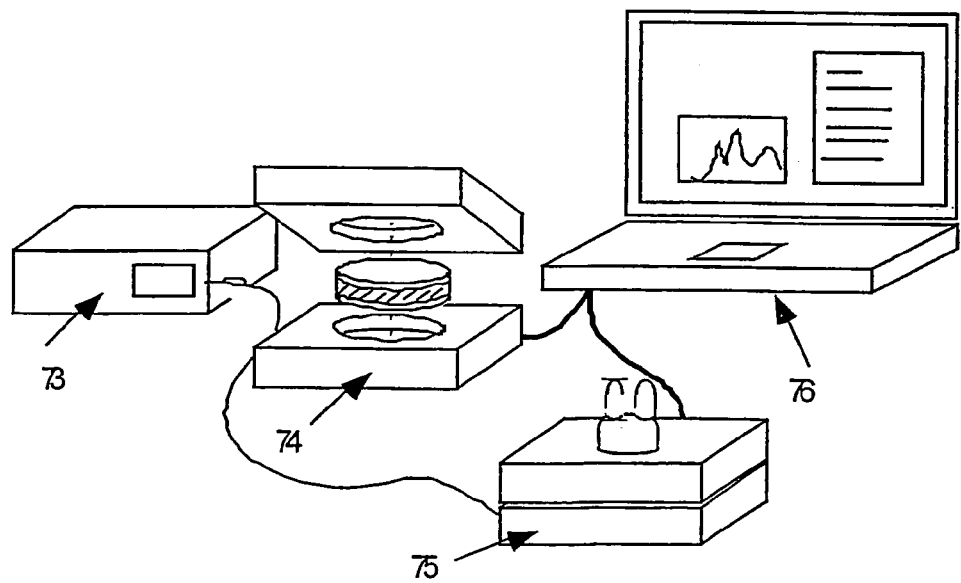
FIG. 22 shows a schematic view of a growth cell being inserted into a handling instrument connected to a power supply and computer, and another handling instrument used to detect e.g. biological samples interacting with nanostructures, and containing necessary software for analysis of the interaction.

In FIG. 22 a setup of the apparatus as used in one embodiment is illustrated. In this figure, a simple schematic picture of a growth cell placed in a handling system 74 with means to perform nanoscale motion is shown. Also is shown a connection to power supply 73 and a standard computer 76, which is used to perform all necessary control of motion and processing algorithms. A second handling instrument 75 is shown which has no means for nanoscale motion but allows access for inserting biological liquids inside the growth cell for doing research work. The interaction of the grown nanostructure with the biologic sample liquid is monitored with special software and hardware found in the second handling instrument. Other types of handling instruments could be handling instruments used to prepare and change Si chips for transformation into process chips or processing chips using thin film equipment and lithography tools.

Having thus described a preferred embodiment of the invention in sufficient detail to enable those skilled in the art to make and use the invention, it will never the less be appreciated that numerous variations and modifications of the illustrated embodiments may be made without departing from the spirit of the invention, including variations in the processes and material to which the invention is applied, as well as the specific manner in which the cell and handling instrument is constructed and therefore it is intended that the invention not be limited by the above description or accompanying drawings, but that it be defined solely in accordance with the appended claims.

The invention claimed is:

1. An apparatus for growing and/or etching at least one nanoscopic structure, said apparatus comprising:
   a. a process cell comprising a first and a second plate positioned in a substantially parallel arrangement, wherein at least one of the plates is provided with at least one electrode and optionally at least one prefabricated localized structure facing the other plate;
   b. a deformable material joining the first and second plate, said material forming a seal between the first and second plate while facilitating movement of the plates relative to each other;
   c. means for inserting and removing a growth and/or etching medium between the two plates;
   d. an energy source for applying electric pulses to individual electrodes, to form one or more electron-emitting tips thereby inducing nanoscopic growth and/or nanoscopic etching;
   e. a nanoscopic moving means for moving at least one of the plates in a nanometric scale motion in three dimensions.

2. An apparatus according to claim 1, further comprising pads that are placed on, or grown by the tips on, one or both of the plates, wherein the height of the pads is larger than the height of the tips, and wherein the pads provide sponginess and elasticity to the relative movement of the plates.

3. An apparatus according to claim 1, wherein the at least one electrode is comprised of an array of tips.

4. An apparatus according to claim 1, further comprising a replaceable processing area and/or processing chip.

5. An apparatus according to claim 1, wherein the energy source is a controllable voltage source connected to the at least one electrode.

6. An apparatus according to claim 1, wherein growth of nanoscopic structures comprises growing at least two oppositely arranged first and second localized nanoscopic structures on said first and second plates until a predefined distance between the two oppositely arranged structures is reached.

7. An apparatus according to claim 6, wherein the predefined distance is obtained by monitoring the tunnelling current, the electric contact and/or the force contact state between said first and second localized nanoscopic structures.

8. An apparatus according to claim 1, wherein the growth and/or etching medium is selected from the group consisting of a gas, a liquid or a solid, a cryogenic gas, a cryogenic solid, a cryogenic liquid and an electrolyte.

9. An apparatus according to claim 8, wherein the medium further comprises elements of the groups III-VII in the periodic system and/or molecular hydrides of the formula $MH_x$, where M represents any element that forms a stable compound with hydrogen and x is an integer number.

10. An apparatus according to claim 1, wherein coded positional information is grown and/or etched on the first and/or second plate.

11. An apparatus according to claim 10, wherein the coded positional information is read by the at least one nanoscopic structure on one and/or both of the plates.

12. An apparatus according to claim 1, further comprising communication means connected to said electrode (18) and a process chip, and a computer system for controlling the growth and/or the etching process.

13. An apparatus according to claim 12, further comprising a handling instrument adapted to house the process cell, said handling instrument comprising said moving means and said computer system.

14. An apparatus according to claim 13, wherein the handling instrument further comprises a controllable heating and cooling device.

15. A method of growing and/or etching at least one nanoscopic structure, comprising providing a growth and/or etching material between the two plates of an apparatus according to claim 1, and transmitting an electrical pulse from the at least one electrode into the medium towards the opposite plate, and thereby growing and/or etching at least one nanoscopic structure.

16. The method according to claim 15, wherein the at least one nanostructure is at least one selected from the group consisting of a quantum electronic device, quantum optical device, memory device, sensor device, functional membrane, nano-wire and molecular electronic device.

17. The method according to claim 15, wherein growth of nanoscopic structures comprises growing at least two oppositely arranged first and second localized nanoscopic structures on said first and second plates until a predefined distance between the two oppositely arranged structures is reached.

18. The method according to claim 17, wherein the predefined distance is obtained by monitoring the tunnelling current, the electric contact and/or the force contact state between said first and second localized nanoscopic structures.

19. The method according to claim 15, wherein at least one first localized nanoscopic structure is grown from the at least one electrode, and wherein during subsequent growth and/or etching of at least one second nanoscopic structure, the height, depth and shape of said at least one first nanoscopic structure is maintained.

20. A method according to claim 19, wherein said at least one first nanoscopic structure is used to grow nanostructures over the area defined by said at least one first nanoscopic structure and the relative movement range of the plates.

21. The method according to claim 15, wherein the height, depth and/or shape of said at least one nanoscopic structure is adjusted by the relative movement of the two plates in a three-dimensional motion, a two-dimensional motion or a one-dimensional motion on a nanometric scale.

22. The method according to claim 21, wherein the movement is a nanometric scale movement.

23. The method according to claim 15, wherein the height, depth and/or shape of said nanoscopic structures is monitored.

24. The method according to claim 23, wherein monitoring the height, depth and/or shape of said nanoscopic structures comprises the steps of:
   a. adjusting the relative position of said first and second plates so that said at least one nanoscopic structure is facing a plate area on the oppositely located plate;
   b. moving one of the plates downwardly until a tunnelling current, an electric contact and/or a force contact state is reached between said at least one nanoscopic structure and the plate area; and c. monitoring which of said at least one nanoscopic structure does not have a tunnelling current, electric contact and/or force contact state established and based thereon registering which of said at least one nanoscopic structure requires additional growth to reach the desired height, depth and/or shape.

25. A method according to claim 24, wherein said at least one registered nanoscopic structures (64, 65) is provided with an additional growth to reach desired height, depth and/or and shape.

26. A method according to claim 24, wherein the procedure of monitoring, registering and growing is repeated until desired height, depth and/or shape of said nanoscopic structures is reached.

27. A method according to claim 24, wherein the procedure of monitoring, registering and growing said nanoscopic structures is used for repairing said nanoscopic structures.

* * * * *